(12) United States Patent
Porter et al.

(10) Patent No.: US 9,071,871 B2
(45) Date of Patent: Jun. 30, 2015

(54) GRANULAR TAGGING OF CONTENT

(75) Inventors: Scott Porter, Sammamish, WA (US);
Charlie Nilsson, Sammamish, WA (US);
Ryan Andrew Powell, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 288 days.

(21) Appl. No.: 12/963,515

(22) Filed: Dec. 8, 2010

(65) Prior Publication Data

US 2012/0151217 A1    Jun. 14, 2012

(51) Int. Cl.
| H04L 9/32 | (2006.01) |
| H04N 21/454 | (2011.01) |
| H04N 21/475 | (2011.01) |
| H04N 21/84 | (2011.01) |
| G06F 21/62 | (2013.01) |

(52) U.S. Cl.
CPC ....... *H04N 21/4542* (2013.01); *H04N 21/4751* (2013.01); *H04N 21/84* (2013.01); *G06F 21/6227* (2013.01); *G06F 2221/2149* (2013.01)

(58) Field of Classification Search
USPC ....................................... 713/178; 725/25, 28
See application file for complete search history.

(56) References Cited

U.S. PATENT DOCUMENTS

| 7,134,130 | B1 | 11/2006 | Thomas | |
| 7,220,910 | B2 * | 5/2007 | Plastina et al. ................... | 84/615 |
| 2002/0147782 | A1 | 10/2002 | Dimitrova et al. | |
| 2003/0122966 | A1 | 7/2003 | Markman et al. | |
| 2007/0168853 | A1 | 7/2007 | Jarman | |
| 2007/0180488 | A1 * | 8/2007 | Walter et al. ................... | 725/135 |
| 2007/0186228 | A1 * | 8/2007 | Ramaswamy et al. .......... | 725/14 |
| 2007/0212025 | A1 | 9/2007 | Barton et al. | |
| 2008/0101456 | A1 * | 5/2008 | Ridge et al. .............. | 375/240.01 |
| 2008/0222201 | A1 * | 9/2008 | Chen et al. ................. | 707/104.1 |
| 2008/0317433 | A1 * | 12/2008 | Hamada .......................... | 386/68 |
| 2009/0083326 | A1 * | 3/2009 | Pelton .................... | 707/104.1 |
| 2009/0222849 | A1 * | 9/2009 | Peters .............................. | 725/28 |
| 2009/0254607 | A1 * | 10/2009 | Zalewski ....................... | 709/203 |

(Continued)

FOREIGN PATENT DOCUMENTS

| CN | 101110929 A | 1/2008 |
| CN | 101473649 A | 7/2009 |
| CN | 101506795 A | 8/2009 |

OTHER PUBLICATIONS

"Real-time movie censoring", Retrieved at << http://semantic-compositions.typepad.com/index/2004/04/realtime_movie_html >>, Apr. 14, 2004, pp. 4.

(Continued)

*Primary Examiner* — Mohammad A Siddiqi
(74) *Attorney, Agent, or Firm* — Dan Choi; Judy Yee; Micky Minhas

(57) ABSTRACT

A method of associating metadata with digital content items is provided. The method includes determining portions of a digital content item containing content meriting associating of preexisting or dynamically-determined metadata information, associating such preexisting or dynamically-determined metadata with selected portions of the digital content item via application of tags to the selected portions, and controlling, during a dynamically unfolding time interval definable via timestamps, subsequent consumption of the digital content item based on the intermittent presence of tags.

14 Claims, 4 Drawing Sheets

(56) References Cited

U.S. PATENT DOCUMENTS

| | | | |
|---|---|---|---|
| 2010/0070643 A1* | 3/2010 | Puranik et al. | 709/231 |
| 2011/0161413 A1* | 6/2011 | Cierniak et al. | 709/203 |
| 2011/0283311 A1* | 11/2011 | Luong | 725/28 |
| 2011/0302598 A1* | 12/2011 | Lundgren et al. | 725/25 |
| 2012/0158755 A1* | 6/2012 | Gammill et al. | 707/754 |

OTHER PUBLICATIONS

Gentile, Gary., "New DVD players can filter movie content", Retrieved at << http://www.msnbc.msn.com/id/4780312/ >>, Retrieved Date: Sep. 3, 2010, pp. 2.

Schumacher-Rasmussen, Eric., "Content Filtering Comes to DVD", Retrieved at << http://www.emedialive.com/Articles/ReadArticle.aspx?ArticleID=5263 >>, Jun. 1, 2002, pp. 2.

State Intellectual Property Office of China, Office Action of Chinese Patent Application No. 201110430544.8, Dec. 23, 2013, 12 pages.

State Intellectual Property Office of China, Second Office Action of Chinese Patent Application No. 201110430544.8, May 22, 2014, 11 pages.

State Intellectual Property Office of China, Third Office Action of Chinese Patent Application No. 201110430544.8, Aug. 20, 2014, 11 pages.

* cited by examiner

GRANULAR TAGGING OF CONTENT

BACKGROUND

Computer and communications networks such as the Internet have grown in sophistication in terms of solutions for helping users identify the appropriateness level of online and other digital content. With respect to movies and video games, rating systems have long existed in which an age-based rating is associated with a consumable media product. Video games, for example, may be rated as "Mature," "Teen," etc. Also familiar is the ratings scheme for movies employed by the Motion Picture Association of America.

These rating systems certainly are adequate for many consumers, and can provide parents and others with a clear indication of the types of content that may be encountered in a movie or video game. Nonetheless, the ratings are often simplistic and arbitrary, and are based on the editorial tastes of an often anonymous group of reviewers. Further, a wholesale rating is applied even where the large majority of a piece is free of any objectionable content. In addition, the user is without any control or tools with respect to the ratings, and their only interaction with the rating itself is perceiving it and determining whether to factor it into their consumption behavior or that of their children or others.

SUMMARY

The present disclosure provides for systems and methods of associating metadata with a digital content item. Such metadata may include a tag or other indicia of the nature of the content and whether or not it is objectionable according to one or more standards or with respect to one or more consumer groups, such as children, teenagers and the like. In some examples, tags or other metadata are generated actively by parents through explicit assignment of tags. In other cases, a community reaction to a piece of content is used to determine or infer tags or other metadata indicating the content or objectionable nature of the content. Furthermore, tags may be generated by companion devices and/or in real time in connection with a principle consumption device, and it is contemplated that the principle and/or companion device may be selected from a variety of user devices, including desktop computers, laptops, tablet/pad devices, portable readers, smart phones and other handheld devices, set top boxes, video game consoles, high definition television sets, etc. Still further, tags may be associated through a variety of methods with individual portions of a digital content item, such as timestamp-identified portions of a video clip. Tags may then be used as the basis for controlling subsequent consumption of digital content items, for example through skipping or removing objectionable content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
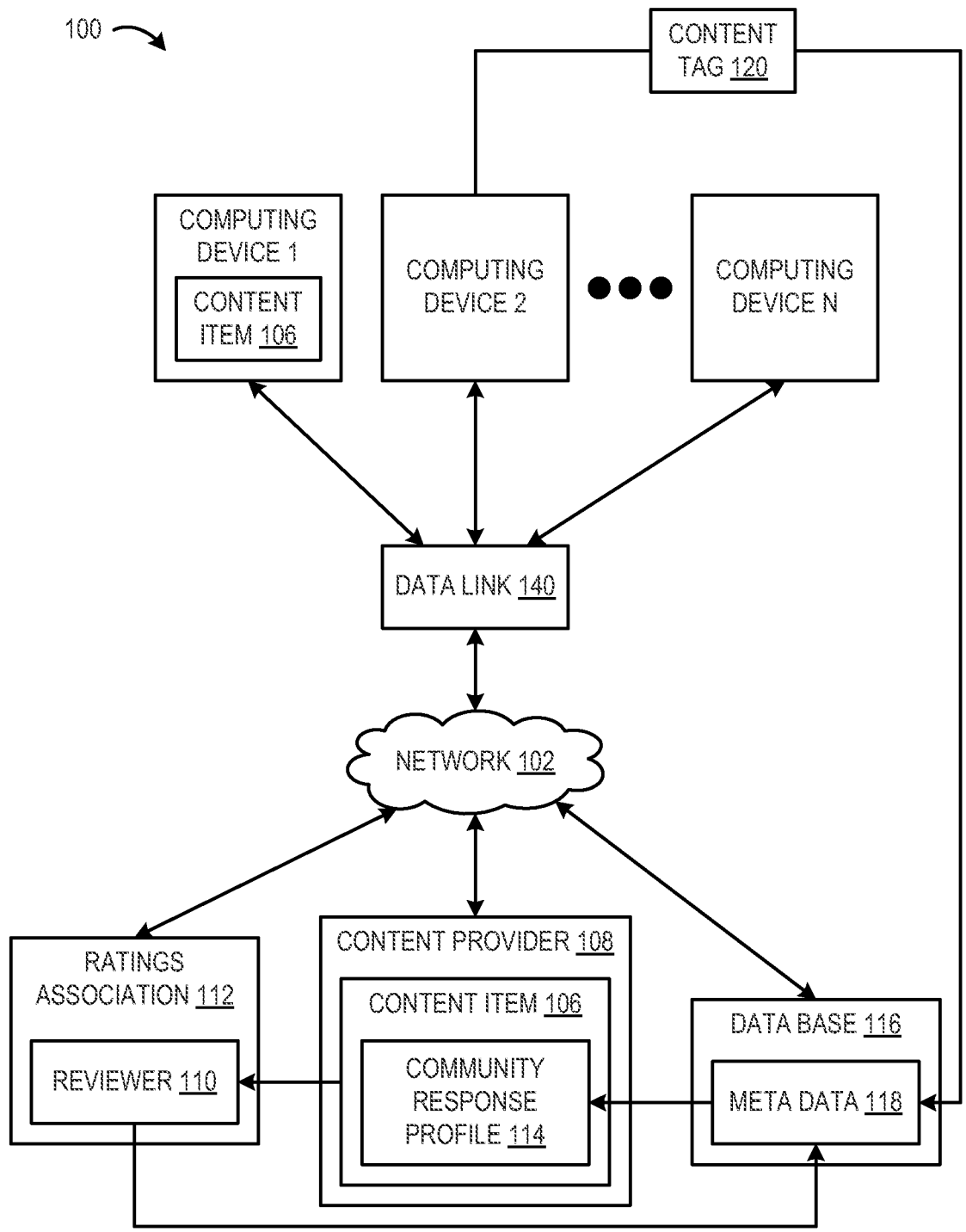
FIG. 1 depicts various computing devices and a communications/computer network containing various data and entities implicated and participating in content tagging that may be achieved and leveraged at a client device to control consumption of digital content items.

FIG. 1 depicts various computing devices/systems at 100. These systems/devices may form a collection of devices that are owned and controlled by an individual user, who may be one of many. These devices may be coupled to a computer or communications network 102 (e.g., the Internet) via any appropriate link or data connection 140. Network 102 may include digital content items 106 available from one or more content providers 108 that provides the content items 106 to one or more of the computing devices 100 for consumption. Content items may be reviewed by reviewers 110 (amateur or professional) who may be affiliated with ratings associations 112 (e.g., the MPAA). Ratings, reviews and other responses may be or form part of a community response to digital content items, such that community response profiles 114 may arise for digital content items. Community response profiles may be established and reside in the "cloud" or they may be assembled and generated at an end user device. For example, one of the computing devices 100 (e.g., COMPUTING DEVICE 2) may be configured to generate a content tag 120 or other metadata information associated with content item 106 and send the content tag 120 to the database 116 to be used to populate the community response profile 114 of the content 106. In any case, the typical use of these profiles contemplates that they are pre-existing prior to a user requesting consumption of a digital content item with which the profile is associated. Still further, metadata 118 such as reviews, ratings, tags and the like may be stored in a database 116 of metadata, which may or may not include the actual content items with which the metadata is associated.

In some cases, the collection of devices for a given user may be referred to as the device domain for that user. Accordingly, the devices may constitute an aggregate logical grouping enabling sharing of metadata and other information without regard to device distinctions. In other examples, devices may be paired or grouped in larger groupings for purposes of collaborative interaction in tagging and controlling consumption of digital content items.

The devices shown in FIG. 1 may be used to generate or receive determinations associated with digital content items, where such determinations may include that the digital content item merits association of various different types of metadata information with the content. Such metadata may include tags, such as tags indicating that the content includes nudity, adult language, violence, graphic drug use and sexual situations, etc. In some cases, these indications are associated with a media item as a whole, without identification of where or when such content arises.

In other cases, the metadata information is specifically associated with selected portions of the digital content item, such as timestamped locations in a media item that is presented sequentially as a series of portions, in either an analog or discrete sense (e.g., chapters or sections of a DVD). This may be conceptualized as tags defined as a function of time, in which time occurs along a horizontal axis, with multiple different vertical axes being available to identify different types of tags—adult language, violence and the like. This function/axis formulation may also be used to describe a community response profile. Such tags or metadata associated with a content item may be used by a computing device to control presentation of that content item for consumption. Control of presentation may take various forms. In one example, the presentation of the content is prevented entirely. In another example, objectionable content portions are skipped. Still another example is to remove objectionable content. A still further example is to replace the content with something else, such as an overdub, black rectangle on the screen over an objectionable image, etc.

Figure 2:
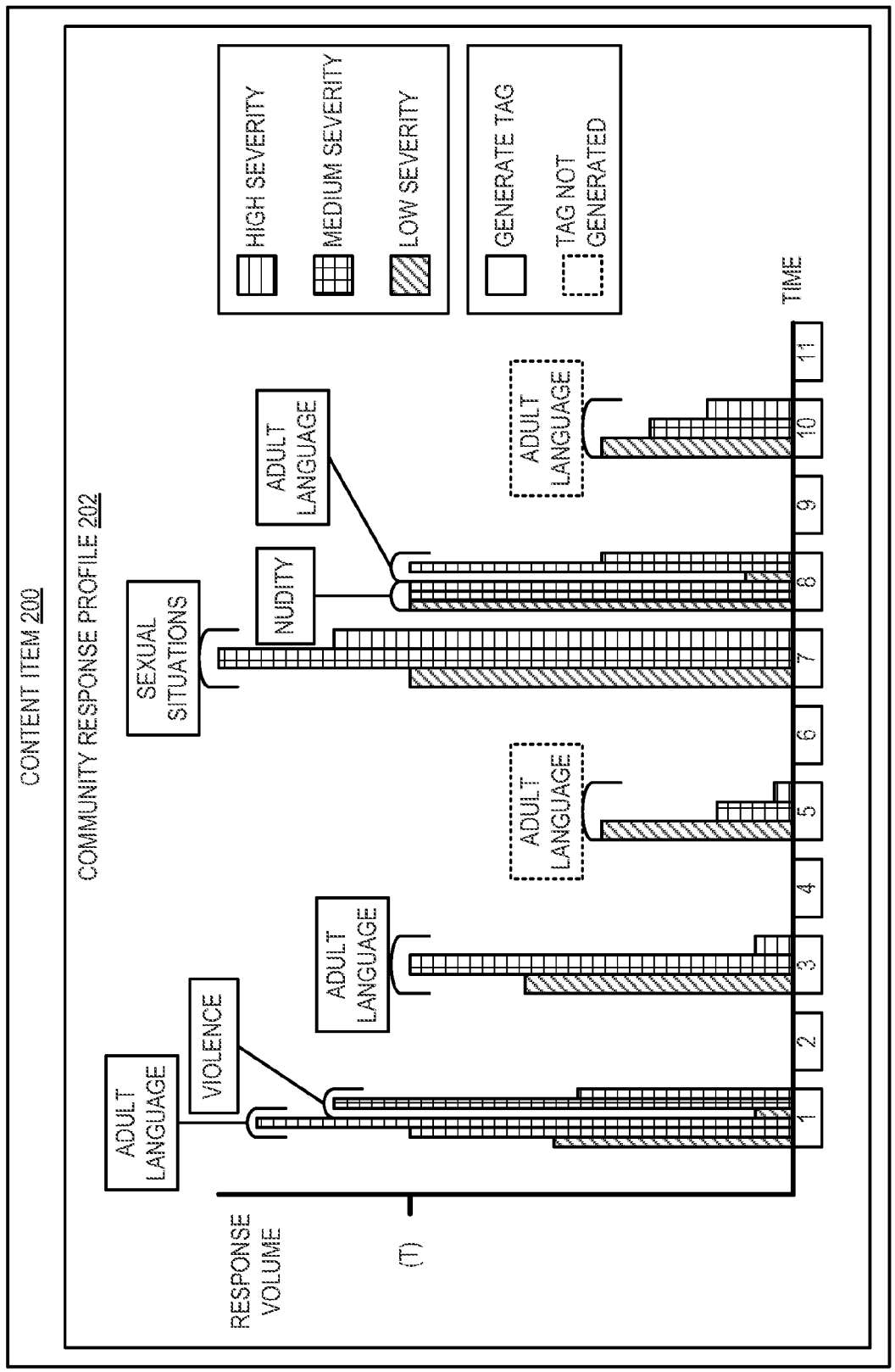
FIG. 2 depicts a response profile associated with a selected content item. The depicted example is a community response profile, but the diagram applies equally to responses and tags set forth by an individual user.

FIG. 2 provides an example of a content item 200 including an associated community response profile 202. Community may of course be defined as any collection or population of individual users or groups of users. As before, time appears on the horizontal axis, with the difference being that the vertical axis corresponds to a volume of community responses. In addition to simple indications of volume, the vertical axis may be similar to that described in previous examples, where separate indications were provided for different tags. In the case of the community response profile, the individual tag axes would again describe relatively higher or lower volumes of responses characterizing objections such as violence, sexual situations, etc. that are associated with timestampable portion of the digital content item. In the case of the individual profile, the vertical axes may correspond instead to a severity or appropriateness associated with the tag—for example a highly objectionable sexual scene, versus a relatively chaste depiction of a kiss. Such appropriateness levels may be used to modify a content item differently for different users. For example, a content item with a particular appropriate level may be suitable for a certain age group, such that a user of a first age may be permitted to view the content item that is inaccessible to a user of a second younger age. In one particular example, a tag with an age specific appropriateness level can be explicitly assigned via an administrative or parental end user to constrain consumption of a second user, such as a younger child.

As indicated in FIG. 2, the response volumes from the community may be compared to a threshold (T) in order to determine whether a tag should be associated with the selected content item being considered by the end user. In some cases, more than one threshold may be employed. For example, a first threshold for determining an adult language tag may be set at a first response volume level and a violent tag may be set at a second response volume level different that the first response volume level. The profile may be further used as a control input to control the dynamic tagging occurring with respect to a content item under consideration.

More direct tagging may be achieved through explicit assignment of metadata and tags by an administrative or parental user, in order to constrain consumption by a child or other end user. These tags may be generated in real time, in advance, or in any other time relationship to the initial and subsequent consumptions. Again, the tags may indicate type or nature of the objections, and indications of severity may be included in the metadata.

In many cases, as described above, it may be useful to employ two or more devices in a collaborative effort to assign metadata and control consumption in response to the metadata. In one example, content consumption is requested and initiated at a first device (e.g., COMPUTING DEVICE 1 shown in FIG. 1), which may be referred to as the principal device. A companion or secondary device (e.g., COMPUTING DEVICE 2 shown in FIG. 1) may be used, during consumption on the first device, to engage in an editorial function, in which it is used to annotate the media item in real time with appropriate tags and other metadata (e.g. CONTENT TAG 120 shown in FIG. 1). As in previous examples, this companion device may be used for explicit assignment of tags, or may use or be controlled by a community response profile. A still further option is for the device to simply respond to and effect control derived from metadata and tags obtained from a remote or local database (e.g., database 116).

Once metadata and tags are associated with a content item, subsequent consumption of the content item may be controlled and/or constrained based on the tags and other metadata. In one example, control is achieved through a simple binary decision as to whether or not to present a digital content item. In another example, objectionable content having timestamps or other portion-indicating markers is removed from the content item so that it is rendered non-objectionable. In still another example, the presentation of the content is modified to skip the objectionable sequences to again render the item non-objectionable. Skipping, fast forward, muting/volume reduction, content replacement and blocking of the objectionable content portions are example actions that may be associated with a tagged portion of a content item. Those skilled in the art will appreciate that these are non-limiting examples, and that any number and type of actions may be employed in response to the granular tagging described herein.

Figure 3:
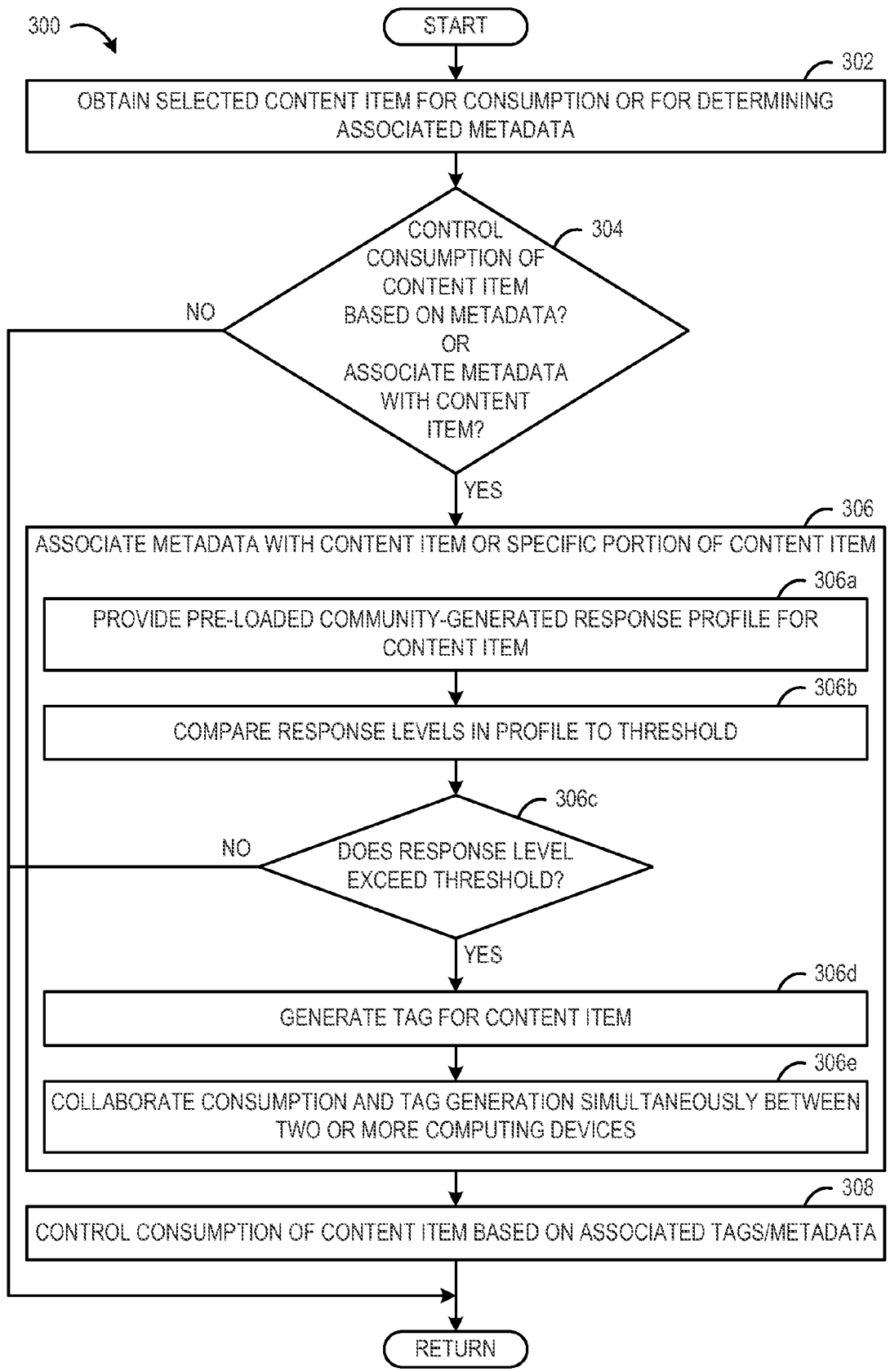
FIG. 3 depicts an exemplary method for associating metadata with digital content items and using that metadata to control consumption.

FIG. 3 depicts an exemplary method 300 for determining content tags to control and constrain consumption. First, at 302, a selected content item is considered for consumption or is being obtained or considered for the specific purpose of determining and associating metadata with the item. At 304, it is determined whether the selected content item merits the association of metadata to indicate content objections or provide some other basis for controlling consumption. The determination may occur with respect to the item as a whole, or it may be made in connection with portions of the item, such as timestamp portions or chapters. In either case, the determination may occur ahead of time (a preexisting determination) or may be dynamically-determined in real time.

Then, at step 306, metadata is associated with the selected content item, or with specific portions of the content item. In referring to "portions," it is contemplated that this term will encompass continuous analog items that are infinitely divisible in time or other respects, as well as discrete or quantized items, that may be discretely subdivided (e.g., chapters or playable sections of a DVD). The association that occurs typically is achieved through use of tags that indicate the type of objectionable content and perhaps the severity or other aspects of the content. The tag mechanism is also highly flexible in the sense that multiple tags may be applied to a given item or portion thereof.

Steps 304 and 306 may be achieved in various ways. In a first example, a parental or other administrative type user will explicitly assign the metadata. In other cases, the determination and association are derived from or made in response to data stored remotely or locally in a preexisting database, such as database 116. In another example community information may be used to make the determination and/or control consumption of the content item. For example, a pre-loaded community-generated response profile may be provided, as shown at optional step 306a. In one example, the community-generated response profile may be established prior to the determining and associating steps. For example, the community-response profile may be established via prior collaboration of users in a remote database. Such a community profile may, as previously explained, indicate relatively higher or relatively lower volumes of community responses, including such information at a time-based level of granularity—e.g., associated with timestamped portions of the content item. The community profile may also act as a control input to control generation of tags and/or control presentation of a digital content item. As shown at 306b, response levels may be compared to a threshold (306c), with exceeding values triggering generation and association of a tag to the content (306d).

Continuing with the figure, step 306e (optional) depicts the use of two or more devices in collaboration. For example, metadata may be applied with a secondary device during an initial consumption session occurring on a principle device (e.g., a game console paired with a smart phone). Companion interaction may include receiving and initiating consumption of a digital content item at a first device. Then, during consumption on the first device, the second device is used to dynamically and intermittently associate metadata with the digital content item. Such applications of tags may occur in real-time or pseudo real-time to affect consumption of the content item.

Step 308 depicts the actual control of the consumption behavior. In particular, during dynamic unfolding of a consumption interval, the consumption is controlled based on the tags and other metadata, more particularly in response to the intermittent presence of the tags. In one example, metadata information associated with the content item is stored on a remote database and is delivered to an end user consumption device, via a push or client pull operation, to modify presentation of the content item based on the metadata or tag information. Control of presentation may take various forms. In one example, the presentation of the content is prevented entirely. In another example, objectionable content portions are skipped automatically. Still another example is to remove objectionable content automatically. A still further example is to replace the content with something else, such as an overdub, black rectangle on the screen over an objectionable image, etc.

In some embodiments, the above described methods and processes may be tied to a computing system including one or more computers. In particular, the methods and processes described herein may be implemented as a computer application, computer service, computer API, computer library, and/or other computer program product.

Figure 4:
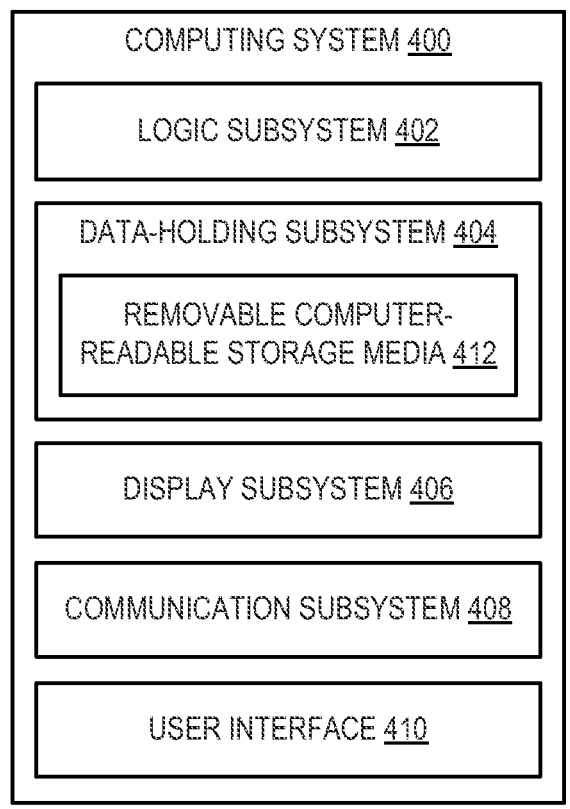
FIG. 4 depicts an exemplary embodiment of a computing device that may be employed in the communications/computer network of FIG. 1.

FIG. 4 schematically shows a nonlimiting computing system 400 that may perform one or more of the above described methods and processes. Moreover, computing system 400 may be representative of one or more of the computing devices/systems 100 shown in FIG. 1 Computing system 400 is shown in simplified form. It is to be understood that virtually any computer architecture may be used without departing from the scope of this disclosure. In different embodiments, computing system 400 may take the form of a mainframe computer, server computer, desktop computer, laptop computer, tablet computer, home entertainment computer, network computing device, mobile computing device, mobile communication device, gaming device, etc.

Computing system 400 includes a logic subsystem 402 and a data-holding subsystem 404. Computing system 400 may optionally include a display subsystem 406, communication subsystem 408, and/or other components not shown in FIG. 4. Computing system 400 may also optionally include user interface 410 including user input devices such as keyboards, mice, game controllers, cameras, microphones, and/or touch screens, for example.

Logic subsystem 402 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result. For example, logic subsystem 402 may be configured to generate one or more tags associated with a content item and/or control presentation of a content item based on one or more associated tags and/or metadata information.

The logic subsystem 402 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 404 may include one or more physical, non-transitory, devices configured to hold data and/or instructions executable by the logic subsystem to implement the herein described methods and processes. When such methods and processes are implemented, the state of data-holding subsystem 404 may be transformed (e.g., to hold different data). For example, metadata information associated with a content item may be stored in data-holding subsystem 404 and the state of the metadata information may be modified by adding a tag as part of a community response profile of the content item.

Data-holding subsystem 404 may include removable media and/or built-in devices. Data-holding subsystem 404 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 404 may include devices with one or more of the following characteristics: volatile, nonvolatile, dynamic, static, read/write, read-only, random access, sequential access, location addressable, file addressable, and content addressable. In some embodiments, logic subsystem 402 and data-holding subsystem 404 may be integrated into one or more common devices, such as an application specific integrated circuit or a system on a chip.

FIG. 4 also shows an aspect of the data-holding subsystem in the form of removable computer-readable storage media 412, which may be used to store and/or transfer data and/or instructions executable to implement the herein described methods and processes. Removable computer-readable storage media 412 may take the form of CDs, DVDs, HD-DVDs, Blu-Ray Discs, EEPROMs, and/or floppy disks, among others.

It is to be appreciated that data-holding subsystem 404 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 400 that is implemented to perform one or more particular functions. In some cases, such a module, program, or engine may be instantiated via logic subsystem 402 executing instructions held by data-holding subsystem 404. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc. For example, a program may be implemented on one or more of the computing devices 100 to present a content item for consumption; correspondingly the same or a different program may be configured to generate a content tag for the content item based on user input to a same or different one of the computing devices 100.

It is to be appreciated that a "service", as used herein, may be an application program executable across multiple user sessions and available to one or more system components, programs, and/or other services. In some implementations, a service may run on a server responsive to a request from a client. For example, the content provider 108 shown in FIG. 1 may execute a service to populate the community response profile 114 of content item 106 with metadata 118 from database 116.

When included, display subsystem 406 may be used to present a visual representation of data held by data-holding subsystem 404. As the herein described methods and processes change the data held by the data-holding subsystem, and thus transform the state of the data-holding subsystem, the state of display subsystem 406 may likewise be transformed to visually represent changes in the underlying data. Display subsystem 406 may include one or more display devices utilizing virtually any type of technology. Such display devices may be combined with logic subsystem 402 and/or data-holding subsystem 404 in a shared enclosure, or such display devices may be peripheral display devices.

When included, communication subsystem 408 may be configured to communicatively couple computing system 400 with one or more other computing devices. Communication subsystem 408 may include wired and/or wireless communication devices compatible with one or more different communication protocols. As nonlimiting examples, the communication subsystem 408 may be configured for communication via a wireless telephone network, a wireless local area network, a wired local area network, a wireless wide area network, a wired wide area network, etc. In some embodiments, the communication subsystem 408 may allow computing system 400 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of associating metadata with digital content items, comprising:

receiving, at a computing device, an audio or video digital content item including one or more community-applied tags, each community-applied tag dynamically applied to the audio or video digital content item during previous consumption of the audio or video digital content item by members of a community based on a respective comparison of one or more response levels of the community to a threshold, each community-applied tag indicating a specific timestamped portion of the audio or video digital content item that includes a temporally-defined audio or video segment that the community collectively deems to be inappropriate or otherwise objectionable for a user, the one or more response levels indicating a response of the community to the timestamped portion, where tags are also applied to the audio or video digital content item by a companion device during previous consumption of the audio or video digital content item at the computing device; and during subsequent consumption of the audio or video digital content item at the computing device, automatically skipping or muting timestamped portions tagged as including the temporally-defined audio or video segment.

2. The method of claim 1, where the one or more community-applied tags are aggregated from members of the community by a content provider server computing device and maintained in a community-generated response profile for the audio or video digital content item.

3. The method of claim 2, where a number of community-applied tags are aggregated by the content provider server computing device for a timestamped portion of the audio or video digital content item and the temporally-defined audio or video segment of the timestamped portion is collectively deemed by the community to be inappropriate or otherwise objectionable for a user if the number of community-applied tags is greater than a threshold.

4. The method of claim 3, wherein different community-applied tags of the one or more community-applied tags have different thresholds that trigger application of those community-applied tags.

5. The method of claim 1, where the one or more community-applied tags include multiple appropriateness levels, such that a user of a first age is permitted to view content that is inaccessible to a user of a second younger age.

6. A method of associating metadata with digital content items in a parental control system in which a parental user desires to constrain consumption of one or more minor users, comprising:

sending an audio or video digital content item from a content provider server computing device to a consumption computing device;

during consumption of the audio or video digital content item on the consumption computing device, receiving at the content provider server computing device from a companion computing device, indications generated by user annotations of the audio or video digital content item on the companion computing device;

at the content provider server computing device, dynamically and intermittently associating metadata information with the audio or video digital content item based on the indication, each association of metadata information indicating a specific timestamped portion of the audio or video digital content item that includes a temporally-defined audio or video segment that is inappropriate or otherwise objectionable for the one or more minor users, and wherein during subsequent consumption of the audio or video digital content item for the one or more minor users at the consumption computing device the timestamped portions including the temporally-defined audio or video segments are automatically skipped over or muted based on the associated metadata information, the metadata information including community-applied tags, each community-applied tag dynamically applied to the audio or video content item during previous consumption of the audio or video digital content item by members of a community based on a respective comparison of one or more response levels of the community to a threshold, the one or more response levels indicating a response of the community to the timestamped portion.

7. The method of claim 6, where objectionable timestamped portions of the digital content item are removed by a primary consumption computing device prior to subsequent consumption based on the metadata information.

8. The method of claim 6, where each community-applied tag indicates a specific timestamped portion of the audio or video digital content item that includes a temporally-defined audio or video segment that the community collectively deems to be inappropriate or otherwise objectionable for a user, and where the community-applied tags are aggregated from members of the community by the content provider server computing device and maintained in a community-generated response profile for the audio or video digital content item.

9. The method of claim 8, where the temporally-defined audio or video segment of the timestamped portion is collectively deemed by the community to be inappropriate or otherwise objectionable for a user if the number of community-applied tags is greater than the threshold.

10. The method of claim 9, wherein different community-applied tags of the community-applied tags have different thresholds that trigger application of those community-applied tags.

11. A consumption computing system, comprising:
a logic subsystem containing one or more processors;
a data-holding subsystem containing instructions executable by the one or more processors to:
receive an audio or video digital content item including one or more community-applied tags, each community-applied tag dynamically applied to the audio or video digital content item during previous consumption of the audio or video digital content item by members of a community based on a respective comparison of one or more response levels of the community to a threshold, each community-applied tag indicating a specific timestamped portion of the audio or video digital content item that includes a temporally-defined audio or video segment that the community collectively deems to be inappropriate or otherwise objectionable for a user, the one or more response levels indicating a response of the community to the timestamped portion; and
during consumption of the audio or video digital content item, perform at least one of skip or remove selected timestamped portions tagged as including the temporally-defined audio or video segment, where prior to such consumption, and during a first consumption session, a second computing system that acts as a companion device to the consumption computing system is used to apply tags to the audio or video digital content item.

12. The system of claim 11, where the one or more community-applied tags are aggregated from members of the community by a content provider server computing device and maintained in a community-generated response profile for the audio or video digital content item.

13. The system of claim 11, where the temporally-defined audio or video segment of the timestamped portion is collectively deemed by the community to be inappropriate or otherwise objectionable for a user if the number of community-applied tags is greater than the threshold.

14. The system of claim 13, wherein different community-applied tags of the one or more community-applied tags have different thresholds that trigger application of those community-applied tags.

* * * * *